United States Patent
Yamaguchi et al.

(10) Patent No.: US 6,384,498 B1
(45) Date of Patent: May 7, 2002

(54) COMPACT VIBRATION MOTOR

(75) Inventors: Tadao Yamaguchi; Koichi Nakajima; Toru Arai, all of Isesaki (JP)

(73) Assignee: Tokyo Parts Industrial Co., Ltd., Isesaki (JP)

( * ) Notice: Subject to any disclaimer, the term of this patent is extended or adjusted under 35 U.S.C. 154(b) by 0 days.

(21) Appl. No.: 09/575,816

(22) Filed: May 22, 2000

(51) Int. Cl.[7] ............................. H02K 7/075; H02K 7/06
(52) U.S. Cl. ............... 310/81; 310/40 MM; 310/154.07
(58) Field of Search ...................... 310/40 MM, 80, 310/81, 154.01, 154.03, 154.05, 154.07, 154.26, 154.41, 154.44

(56) References Cited

U.S. PATENT DOCUMENTS

| | | | | |
|---|---|---|---|---|
| 4,208,784 A | * | 6/1980 | Kincel | 29/596 |
| 4,590,635 A | * | 5/1986 | Tucker et al. | 15/50 R |
| 4,935,080 A | * | 6/1990 | Hassell et al. | 156/154 |
| 5,107,155 A | * | 4/1992 | Yamaguchi | 310/81 |
| 5,793,133 A | * | 8/1998 | Shiraki et al. | 310/81 |
| 5,835,006 A | * | 11/1998 | Michalak et al. | 340/407.1 |
| 6,011,333 A | * | 1/2000 | Yamaguchi et al. | 310/81 |
| 6,051,900 A | * | 4/2000 | Yamaguchi | 310/81 |
| 6,057,753 A | * | 5/2000 | Myers | 340/407.1 |

* cited by examiner

*Primary Examiner*—Karl Tamai
*Assistant Examiner*—Dang Dinh Le
(74) *Attorney, Agent, or Firm*—Leydig, Voit & Mayer, Ltd.

(57) ABSTRACT

A compact motor capable of being reflow-soldered, which can solve a problem of thermal demagnetization of a magnet with a simple structure, has magnets in a housing. At least a part of a surface to which the magnet is attached is separated by an acrylic adhesive sheet and heat resistant resin from metal members, such as a bracket and shaft forming part of the housing. The shaft is stainless steel having a low heat conductivity or an additional cover is used for the shaft to withstand reflow-soldering.

4 Claims, 5 Drawing Sheets

COMPACT VIBRATION MOTOR

BACKGROUND OF THE INVENTION

1. Field of the Invention

The present invention relates to a compact motor used for audio systems such as a mini disk (MD) player or a silent call device of mobile communications apparatuses, and more particularly, to an improved compact motor capable of being reflow-soldered so direct soldering on a printed wiring board is possible.

2. Description of the Related Art

Recently, technology for reflow-soldering of electronic parts to reduce the manufacturing cost has been rapidly developed. However, the reflow-soldering to a compact motor is not possible because of thermal demagnetization generated due to the heating of a built-in magnet. In particular, the problem of thermal demagnetization becomes serious when a high performance magnet inevitable for miniaturization of a system is used.

Since an operation point permeance coefficient is not high in a compact motor mounted in portable devices, thermal demagnetization cannot be avoided. In the case of a neodymium magnet showing great thermal demagnetization, reflow-soldering can not be performed at all. Also, it is not possible to use a magnet of having high coercive force showing less thermal deterioration because of high manufacturing costs.

SUMMARY OF THE INVENTION

To solve the above problems, it is an objective of the present invention to provide a compact motor capable of being reflow-soldered by solving the thermal demagnetization problem of a magnet with a simple structure.

Accordingly, to achieve the above objective, there is provided a compact motor capable of being reflow-soldered which is formed by installing a magnet in a housing, in which at least part of a surface where the magnet is installed is separated from a metal member forming part of the housing. Thus, even when the installation portion of the housing is reflow-soldered, because heat is not directly transferred, thermal demagnetization can be reduced.

It is preferred in the present invention that the magnet is an axial gap type and attached to a part of the housing by a double-sided adhesive sheet as a separating means. Since a double-side adhesive sheet exhibits a thermal insulation effect, transfer of heat to the magnet is difficult. Also, since the sheet is thin and it is not desired that operation point permeance coefficient is sacrificed, it is preferable that an axial gap type is used.

It is preferred in the present invention that the magnet is a radial gap type using a shaft as part of a magnetic path and is incorporated in the shaft through heat resistant resin as a separating means. Since the magnet can be separated from the shaft which is a metal member, transfer of heat to the magnet is difficult.

It is preferred in the present invention that the shaft is formed of stainless steel having a relatively low heat conductivity. Accordingly, a thermal insulation effect of stainless steel can be expected.

It is preferred in the present invention that at least the housing exposed to the outside air is formed of a stainless steel plate having a low heat conductivity. Accordingly, a thermal insulation effect of stainless steel can also be expected.

It is preferred in the present invention that the housing is covered so as not to be exposed directly to the outside air except for an installation portion or terminal to be reflow-soldered at a printed wiring board. Since more thermal insulation effect can be obtained, it is possible to cope with one of which the reflow time is quite long.

It is preferred in the present invention that a shielding portion for preventing transfer of heat to a main body of the housing is installed at the installation portion or terminal and the shielding portion is covered by heat resistant resin. Thus, heat conduction to the main body of the housing is reduced and the strength of the shielding portion can be covered by heat resistant resin.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
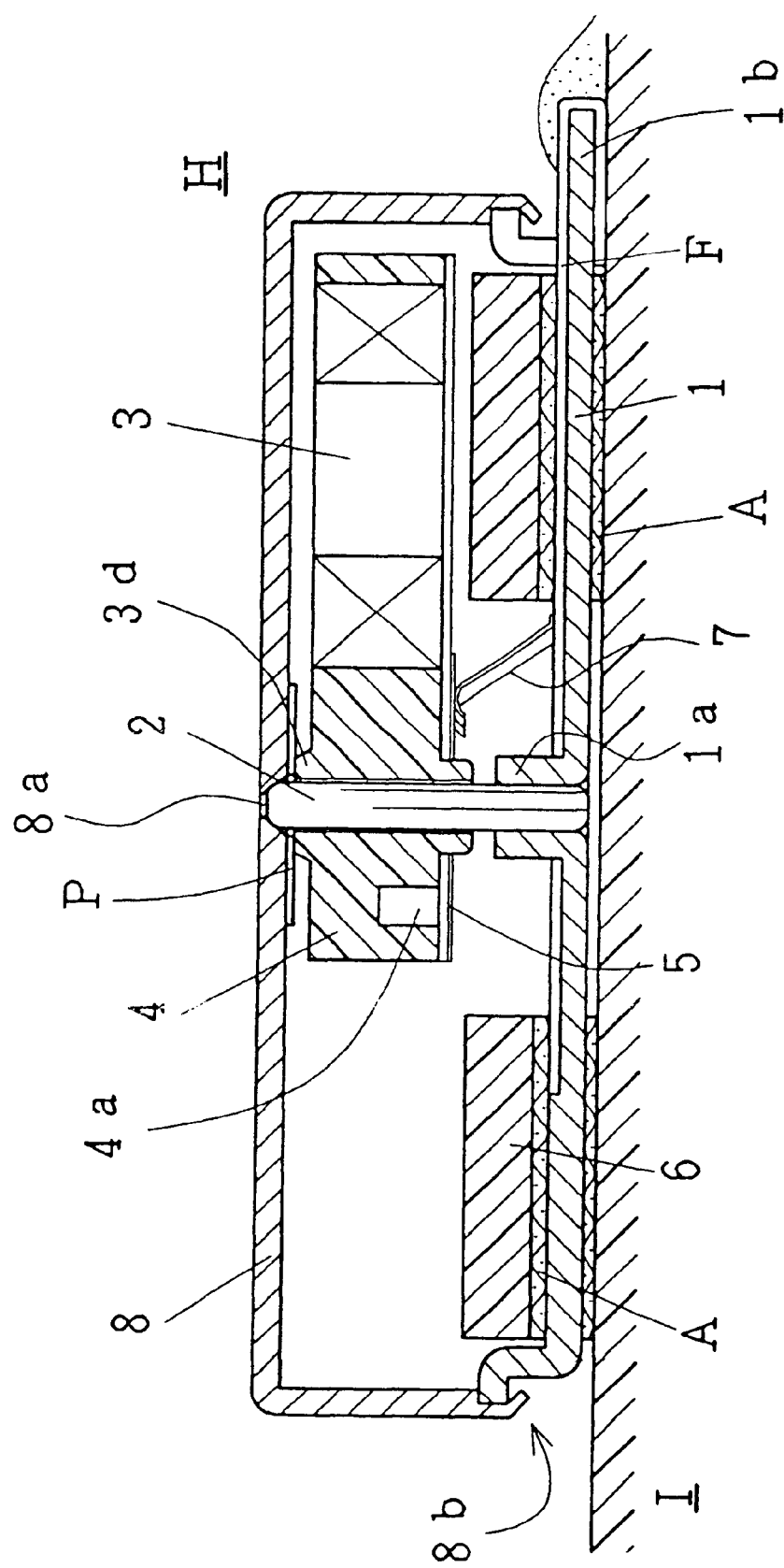
FIG. 1 is a sectional view showing major portions of an axial gap coreless compact motor for generating vibration according to a first preferred embodiment of the present invention.

Referring to FIG. 1, a bracket 1 forms part of a housing H which is a magnetized metal body and a shaft holder 1a is integrally formed with the bracket 1 at the center thereof. A shaft 2 of stainless steel is fixed by inserting one end in the shaft holder 1a. A rotor 3 which is eccentric is rotatably installed at the shaft 2.

Figure 2:
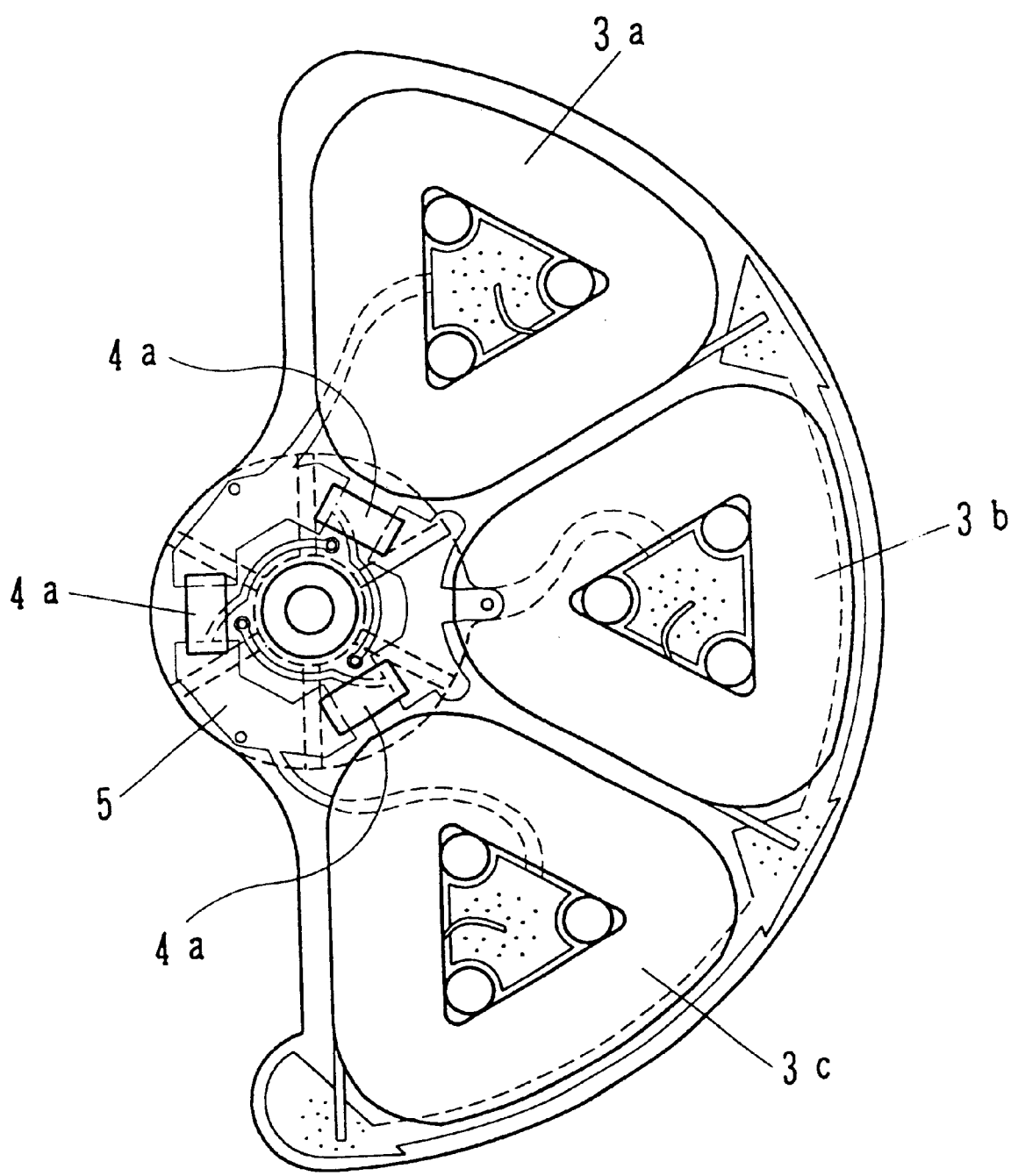
FIG. 2 is a plan view showing major portions of the rotor of the motor of FIG. 1.

The eccentric rotor 3, as shown in FIG. 2, has three air-core armature coils 3a, 3b and 3c arranged to be eccentric to one side, at pitches of about 60°, of the flat panel commutator 5, and is integrally formed with the flat panel commutator 5. The commutator 5 includes a spark removing device 4a of resin 4 (refer to FIG. 1) which is heat resistant and has a low frictional coefficient. The resin having a low frictional coefficient also serves as a bearing.

A ring magnet 6 including neodymium facing the rotor 3 with a gap is attached to the bracket 1 by an acryl-based adhesive sheet A (product name: Sony Chemical T4000) having a thickness of 0.15 mm and using non-woven fabric as a base. Thus, the magnet 6 is separated from the bracket of the housing H.

A pair of brushes 7 are in sliding contact at an open angle of 90° with the inner side of the magnet 6. The flat panel commutator 5 receiving a predetermined pressing force slidingly contacts the brushes 7 so that the brushes 7 receive electric power from the outside through a flexible power feeding sheet F. The leading end of the flexible power feeding sheet F is folded over a piece 1b protruding from the bracket 1 and soldering electrodes are exposed in three directions so that reflow can be performed easily.

A case 8 forming the other portion of the housing H has a tapered through hole 8a arranged at the center thereof in which the other end of the stainless steel shaft 2 is installed. A polyester film P is attached around the through hole 8*a* and slidingly contacts the eccentric rotor 3 through a projection 3*d* by a pressing force of the brushes 7. Accordingly, the rotor 3 is always elastically biased toward the case 8 and is capable of rotating on the polyester film P so that the rotor 3 does not contact the case 8. Also, because a gap is maintained to be constant, the position of rotation does not change so that the rotation of the rotor 3 is stable.

Thus, the rotor 3 is coupled to the bracket 1 by being inserted from the open end of the shaft 2 and the case 8 is capped thereon to cover the outer circumference of the bracket 1, so that the assembly thereof is simplified.

The motor having the above structure is installed on the printed wiring board I together with other electronic parts through the acrylic adhesive sheet A using the non-woven fabric as a base member and having a thickness of about 0.15 mm, and then reflow-soldered.

Also, as a modified example of the present embodiment, the thermal insulation effect of stainless steel may be used by making at least a case side of the housing with weakly magnetized stainless steel.

Figure 3:
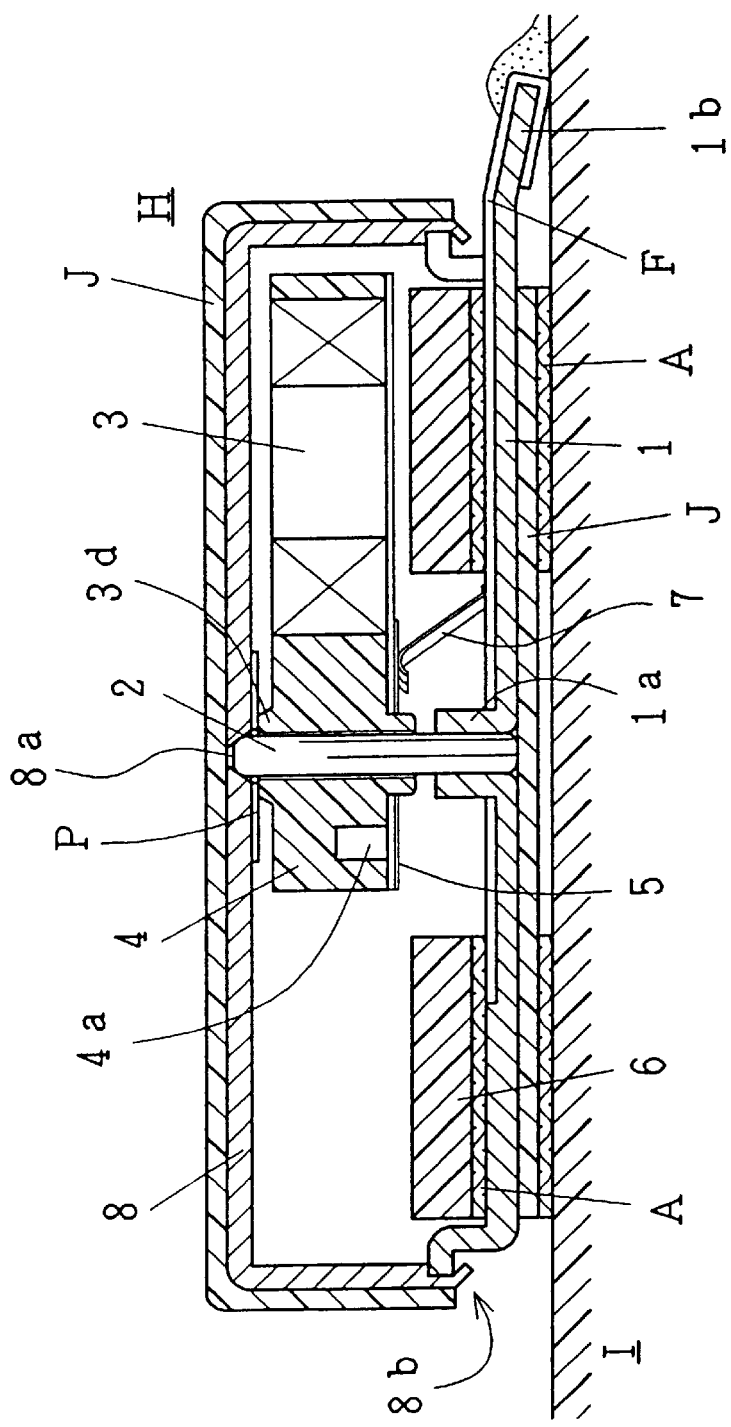
FIG. 3 is a sectional view showing major portions of a motor according to a second preferred embodiment of the present invention.

FIG. 3 shows a second preferred embodiment of the present invention, in which the housing H is covered by resin J having an effect of thermal insulation and being capable of withstanding reflow-soldering, other than the power feeding sheet portion F and a caulking portion in the first preferred embodiment, to prevent direct exposure to the outside air. As the other portions are the same as those in the first preferred embodiment, the same reference numerals are used and the descriptions thereof are omitted.

Figure 4:
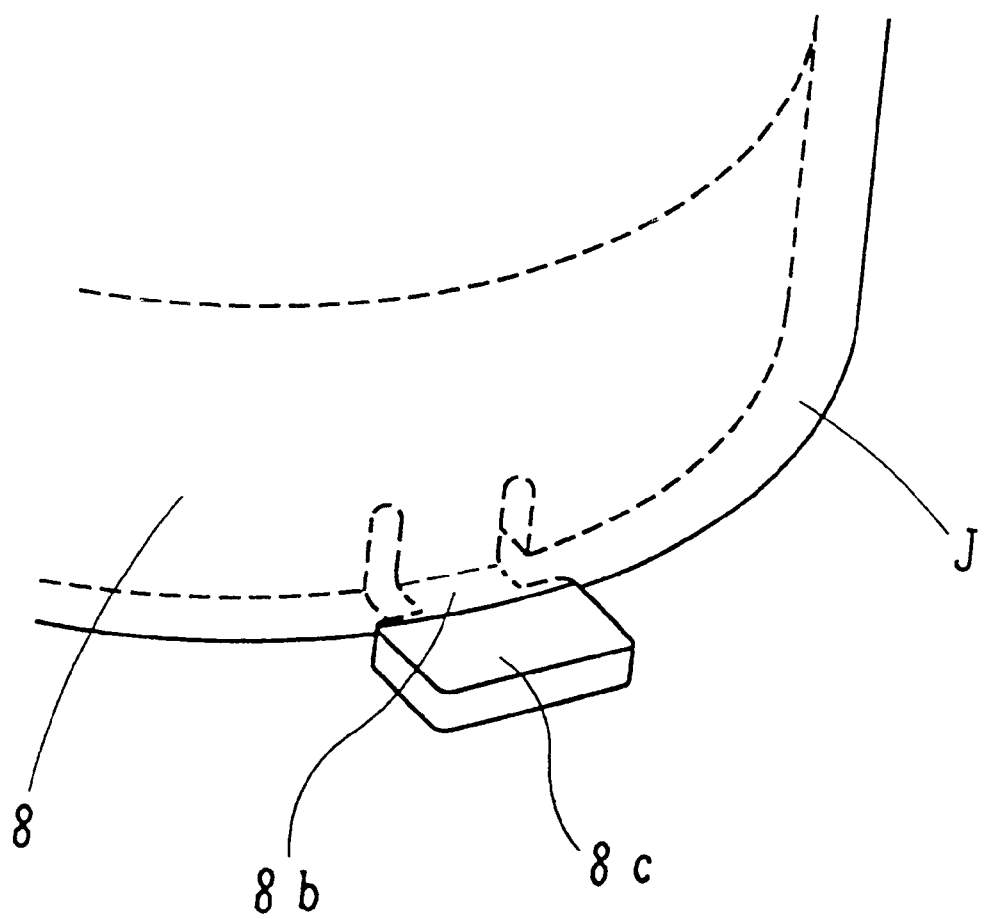
FIG. 4 is a perspective view showing a modified example of a part of the second preferred embodiment of the present invention.

FIG. 4 shows a modification of the second preferred embodiment of the present invention. Here, when a main body of the motor is installed at the printed wiring board by reflow-soldering, instead of using the acrylic adhesive sheet A, an installation leg portion 8*c* protrudes through a shielding portion 8*b* toward the side portion of the case 8 and the installation leg portion 8*c* is attached to the printed wiring board by reflow-soldering.

In this case, the shielding portion 8*b* is integrally formed with resin J which becomes a cover for reinforcement. Thus, the shielding portion 8*b* prevents conduction of heat to the main body of the case and resin J is used for reinforcement.

Also, in the present embodiment, to install the ring magnet 6 including neodymium at the bracket 1 which is a part of the housing, the acrylic adhesive sheet is used as a separating means. However, it may be possible that a plurality of small protrusions are provided at the part of the upper surface of the bracket so that the lower surface of the magnet is not supported by the entire bracket, owing to the small protrusions, thus enabling thermal insulation.

Figure 5:
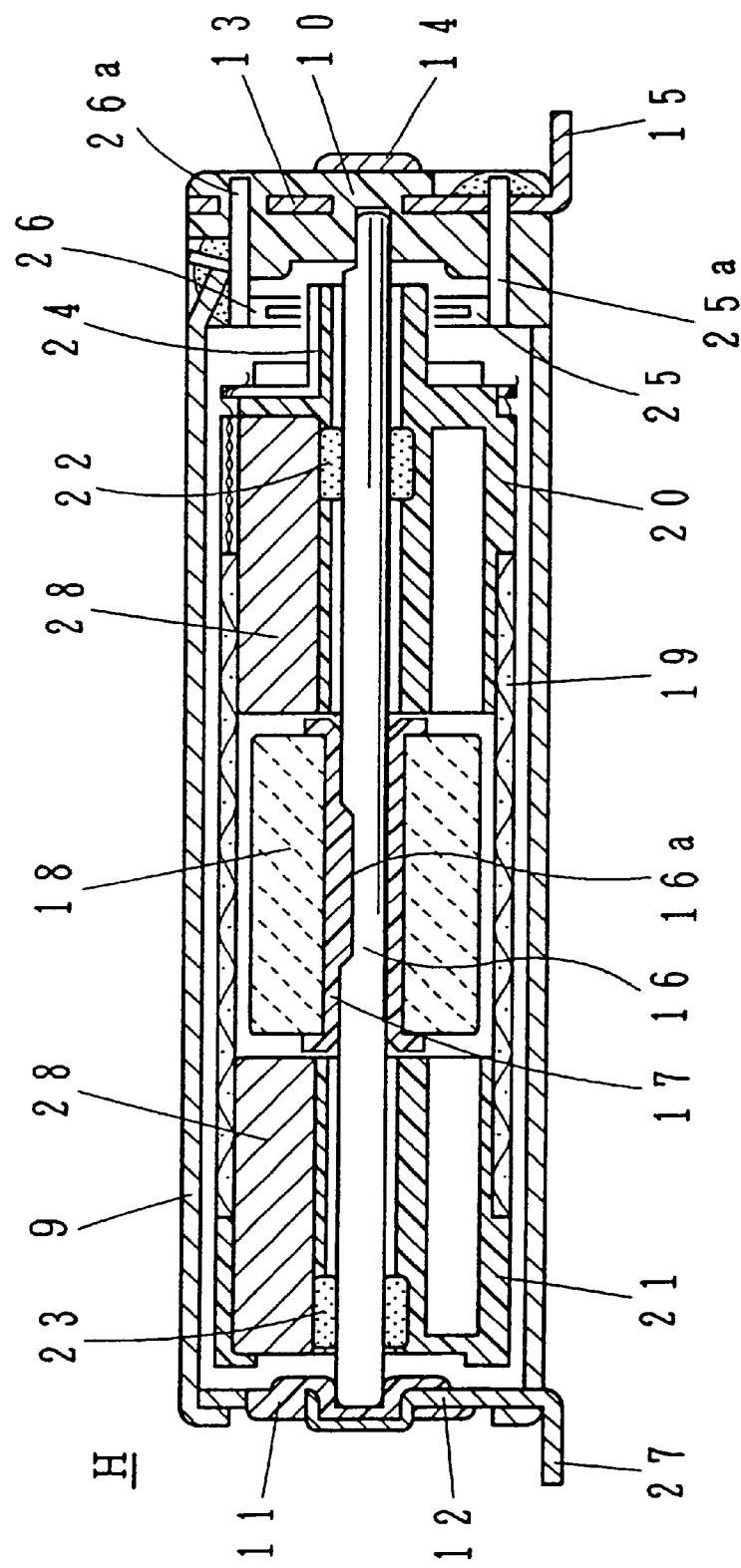
FIG. 5 is a sectional view showing major portions of a radial gap compact motor for generating vibration according to a third preferred embodiment of the present invention.

FIG. 5 shows major portions of a third preferred embodiment of the present invention. That is, a brush base 10 formed of relatively flexible heat resisting synthetic resin is fixedly inserted at one end of a pipe case 9 having both ends open. A case terminal 12 formed by outsert molding a bearing 11 of heat resistant synthetic resin is fixed by caulking at the other end the case 9 to form a housing H. These synthetic resins (for example, Smika Super LCP) exhibit a heat resistance of over 280° C. to bear dipping into soldering and a metal frame 13 for reinforcement is embedded in the brush base 10. A part of the metal frame 13 is a circular electrode 14 in an axial direction and an electrode 15 used as a leg portion for attachment in a radial direction. A shaft 16 is stainless steel has both ends thereof fixedly supported by the brush base 10 and the bearing 11 of the case terminal 12. A shaft fixing cut portion 16*a* is installed at the shaft 16 and a cylindrical magnet 18 is integrally formed with the cut portion 16*a* through a resin 17 which is heat resistant and slippery.

A cylindrical coreless coil 19 is arranged with a gap between the case 9 and the coil 19. A pair of eccentric bearings 22 and 23 is arranged at both ends of the cylindrical coil 19 through the synthetic resin holders 20 and 21 and is supported at the shaft 16 by the bearings 22 and 23 for rotating. Further, a cylindrical commutator 24 is incorporated in the holder 20 at one side, and free ends of a pair of brushes 25 and 26 slidingly contact the commutator 24. The base ends of the brushes 25 and 26 are installed at the brush base 10. A base end 25*a* of the brush 25 at one side is pressed on the metal frame 13, and simultaneously, a base end 26*a* of the brush at the other end is electrically connected to be commutator 24 when the brush base 10 is installed at the case 9 and simultaneously is soldered at an open end portion of the case 9.

In the present embodiment, part of the case terminal 12 protrudes through the shielding portion in a radial direction, forming a leg portion 27 for attachment. Reference numeral 28 denotes a weight for generating vibration, which is integrally formed with the holders 20 and 21 and has a crescent moon shape and a thick profile.

Accordingly, as the magnet 18 does not directly contact the metal portion, rapid transfer of heat during reflow-soldering can be prevented. In particular, it is effective that both ends of the shaft 16 do not contact the metal portion.

Also, although a vibratory motor is described, a typical rotary motor such as a spindle motor, for an MD player and a motor for driving a pickup device, may be used.

It is noted that the present invention is not limited to the preferred embodiment described above, and it is apparent that variations and modifications by those skilled in the art can be effected within the spirit and scope of the present invention defined in the appended claims.

According to the invention, even when the installation portion of the housing is reflow-soldered, because heat is not directly transferred, thermal demagnetization can be reduced.

According to the invention, since a double-sided adhesive sheet provides a thermal insulation, transfer of heat to the magnet is difficult. Also, since the sheet is thin and it is not desirable that the operation point permeance coefficient be sacrificed, it is preferable that an axial gap be used.

According to the invention, since the magnet can be separated from the shaft, which is a metal member, transfer of heat to the magnet is difficult.

According to the invention, the thermal insulation effect of stainless steel is exploited.

According to the invention, since greater thermal insulation effect is obtained, it is possible to cope with a long reflow time.

According to the invention, heat conduction to the main body of the housing is reduced and the shielding portion can be covered by heat resistant resin.

What is claimed is:

1. A compact vibration motor for connection by reflow soldering to a printed wiring board, the motor comprising:
    a pancake housing having a case and a bracket, which form a magnetic path, and a flat bottom for attachment to a printed wiring board;
    a shaft fixed to the housing;
    a flat eccentric rotor rotatably mounted on the shaft and having a commutator and a plurality of air-core armature coils;

a pair of brushes for supplying an electric current to the flat eccentric rotor through the commutator;

a power feeding sheet located at a portion of the pancake housing, protruding from the pancake housing, and to which base ends of the pair of brushes are fixed;

a rare earth magnet located further from the shaft than the brushes, in the pancake housing, and producing a magnetic field reaching the flat eccentric rotor through a gap; and a double-sided adhesive sheet adhering the magnet to the pancake housing so that the magnet and the pancake housing are thermally insulated from each other.

2. The compact vibration motor as claimed in claim 1, comprising a printed wiring board installation terminal located at a portion of the pancake housing.

3. The compact vibration motor as claimed in claim 2, wherein the printed wiring board installation terminal includes a reflow-soldering portion and a thermally insulating portion.

4. The compact vibration motor as claimed in claim 2, comprising a printed wiring board installation terminal exposed outside the pancake housing for reflow-soldering to the printed wiring board, and a cover on the pancake housing for preventing the pancake housing, the shaft, the flat eccentric rotor, the pair of brushes, and the rare earth magnet, but not the power feeding sheet and the printed wiring board installation terminal, from being exposed to air.

* * * * *